Aug. 6, 1968     E. LINDKVIST     3,395,989

APPARATUS FOR THE PRODUCTION OF FORMIC ACID

Original Filed July 10, 1964

United States Patent Office 3,395,989
Patented Aug. 6, 1968

3,395,989
APPARATUS FOR THE PRODUCTION OF
FORMIC ACID
Eirik Lindkvist, Perstorp, Sweden, assignor to Perstorp
 Aktiebolag, Stockholm, Sweden, a corporation of
 Sweden
Original application July 10, 1964, Ser. No. 381,730.
 Divided and this application Aug. 4, 1966, Ser. No.
 593,617
Claims priority, application Sweden, Apr. 3, 1964,
4,097/64
2 Claims. (Cl. 23—263)

ABSTRACT OF THE DISCLOSURE

Formic acid is prepared continuously in an assembly comprising a reactor, means for feeding reactants to the reactor at a controlled rate, a thin layer evaporator, means for withdrawing reaction products from the reactor and feeding the same to the evaporator, a condenser receiving vapor from the evaporator, means for withdrawing solids from the evaporator, and a receiver for condensate from the condenser. The evaporator is a vertically disposed heat-jacketed cylinder provided with a multi-bladed rotor, some of the blades being fixed and the remainder being pivotally mounted and disposed intermediately of the fixed blades, there being a clearance of from 1–5 mm. between the fixed blades and the wall of the evaporator while the pivoted blades engage the wall of the evaporator in scraping relationship upon rotation of the rotor.

---

Figure 1:
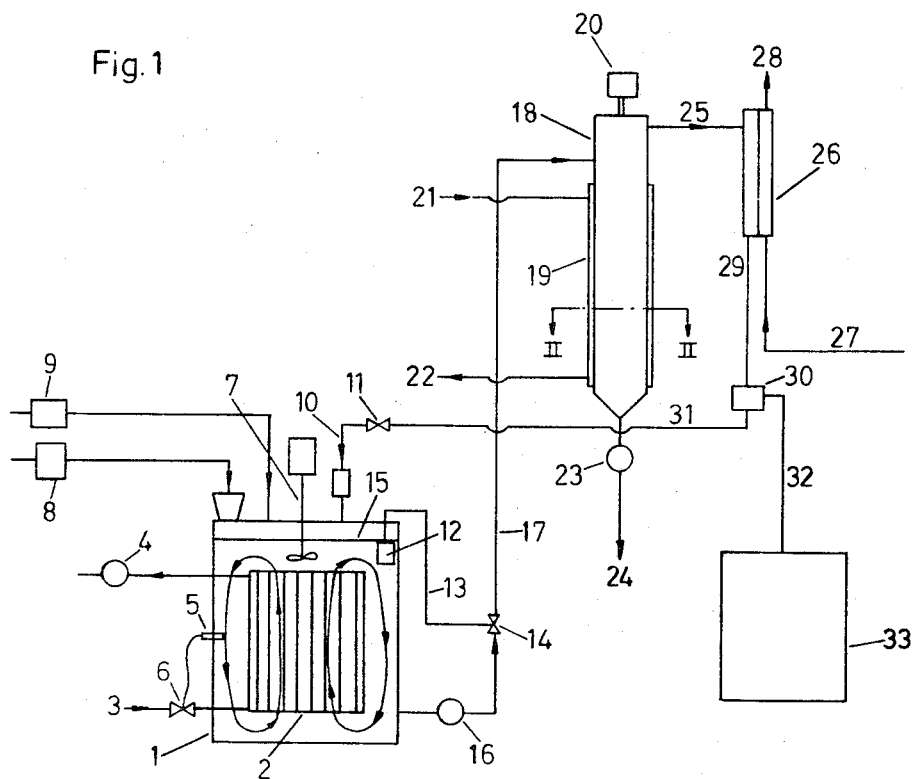

This application is a division of my co-pending application, Ser. No. 381,730, filed July 10, 1964.

Heretofore, formic acid has been prepared batch-wise by reaction of sodium formate and sulfuric acid in stoichiometric proportions in a reaction zone with stirring until near completion. The temperature is maintained at from 35–40° C., occasionally higher, and the residence time is usually a few hours and is then pumped to an intermediate container. From this container the batch is sucked into a so-called distillation bulb, in which the sodium sulphate and formic acid are separated from each other. A pressure of about 30–100 mm. Hg and a temperature of 30–60° C. is maintained in the distillation bulb. The dry sodium sulphate must be sluiced out through a special sluice chamber at the end of the distillation. On account of the vacuum in the distillation bulb, which is provided for lowering the boiling point, solid particles are easily entrained by the distillation gas and have to be removed in a precipitator before the gas is conducted to the condenser. The formic acid thus obtained in the condenser must be sluiced out from the receiver. The vacuum in the system is brought about by means of a vacuum pump, which of course draws great amounts of formic acid vapour out from the system. To avoid loss of this vapour an absorption tower has been arranged between the condenser and the vacuum pump for absorbing the formic acid, which thereafter is conducted back to the reactor as sodium formate. These earlier processes for manufacturing formic acid have many disadvantages. Firstly the work must be carried out discontinuously, secondly vacuum must be maintained in the distillation bulb. The reason for this is that the large batch stays a long time in the distillation bulb and a high boiling temperature should therefore cause great losses of formic acid by decomposition of this formic acid. Further difficulties arise by sluicing out the sodium sulphate and the formed formic acid against the atmosphere pressure and by the necessity of making the inlet for the stirrer axis through the wall of the distillation bulb vacuum tight. Another large disadvantage by these processes is the condensation in the condenser. On account of the low temperature of the vapours of the formic acid, the temperature differance between this and the cooling water is very small. This causes great losses and it requires a big condenser. The investment costs for such a plant will be large, as the system must be designed for subpressure.

The present invention overcomes all these difficulties by working continuously and under atmosphere pressure. This has been made possible through separating the formic acid from the solids in a rapid evaporator, e.g., a thin layer evaporator instead of distillation in vacuum. In a thin layer evaporator the reaction mixture stays only a few seconds for example 10–60 seconds and not longer than a few minutes. The temperature is then maintained in a range of 100–120° C., preferably at 105° C. During this short time the formic acid does not have time enough to decompose even at its boiling point at the atmosphere pressure. By doing so the system having subpressure can be avoided. The process is carried out continuously by feeding stoichiometric amounts of sulphuric acid and sodium formate together with formic acid as a diluent in a reactor, from which the reaction mixture is fed out at such a rate that the liquid level in the reactor is maintained constant. The proportions between the different starting materials may e.g., be 6 kilos 90–95% sodium formate, 2.34 litres 96% sulphuric acid and 6 kilos 85% formic acid per minute. The amount of formic acid added may of course be increased or decreased. However, if too little formic acid is included in the mixture, this will be so viscous that difficulties will arise, when pumping this to the thin layer evaporator, and decomposing reactions may also occur. If on the contrary too much formic acid is contained in the mixture, this will get an unnecessarily large volume, which leads to decreased real production capacity of the thin layer evaporator. It is important for successful performance of the reaction that the amount of sodium formate and sulphuric acid do not differ appreciably from the theoretical values. Thus, the amount of sodium formate may differ at most ±3% and the sulphuric acid at most ±1% from the theoretical values. An excess of sodium formate should only cause losses by the fact that this in an unreacted state would be taken out together with the sodium sulphate, while an excess of sulphuric acid should give a sticky acid product of sodium sulphate. Some after-reaction occurs at the high temperature in the thin layer evaporator.

Figure 2:
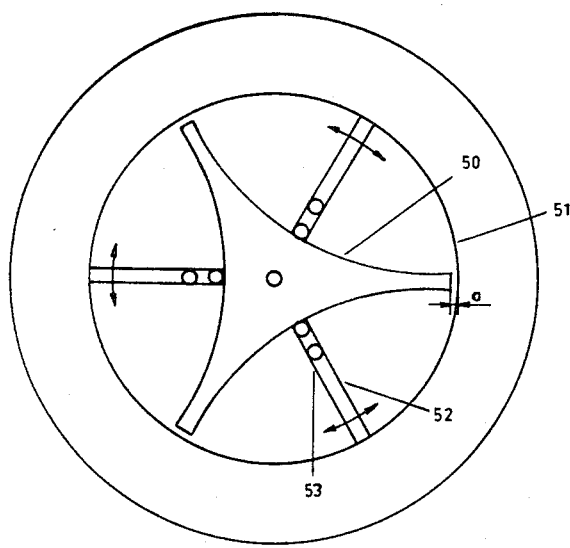

The invention will be more fully described hereinafter in connection with the attached drawings, in which FIGURE 1 is a flow diagram of the process and FIGURE 2 is a horizontal, sectional view of the thin layer evaporator along the line II—II.

In FIGURE 1 a reactor 1 is shown, in which a tube heat exchanger 2 is arranged for cooling the reaction mixture. The cooling water is supplied via the conduit 3 and escapes via conduit 4. A thermo element 5 is inserted in the reaction mixture through the reactor wall and controls valve 6 for the cooling water. The temperature in the reaction mixture should be maintained within a range of 10–50° C., preferably 35° C. A turbine stirrer 7 is arranged in the reactor for circulating the mixture as mentioned. This stirrer is driven with a speed of approx. 1400 r.p.m. The sodium formate is supplied to a dose balance 8 from a silo or the like and is fed continuously into the reactor, e.g., by twelve weighings of ½ kilo per minute. The sulphuric acid is supplied via conduits and is dosed by a piston dose pump 9. The formic acid acting as diluent for the suspension is supplied through the conduit 10. The amount supplied is regulated by means of the valve 11. A level regulator 12, which via a conduit 13 controls throttle valve 14 is arranged to keep the liquid level 15 in the reactor constant. This level regulator may be a conventional one but is conveniently a Kalle-regulator. The reacted mixture is drawn out by means of a pump 16, e.g., a Mono-pump, and is supplied via the conduit 17 to the upper part 18 of the thin layer evaporator. This thin layer evaporator is provided with a heating jacket 19 and a rotor driven by a motor 20. The steam is fed to the steam jacket through the conduit 21, and the condensate is drawn off through the conduit 22. The formic acid and the water is evaporated in the thin layer evaporator, while the formed sodium sulphate is dried and taken out at the bottom part of the thin layer evaporator through a cell feeder 23 and is transported to a store 24. This cell feeder is gas tight to avoid losses for vapour of formic acid. The steam pressure in the steam jacket should be about 10 kilosato. The formic acid vapour rapidly generated in the thin layer evaporator escapes quickly through the conduit 25, and is condensed in the condensor 26. The condenser is cooled by tap water, which is supplied at 27 and is withdrawn at 28. The condensed formic acid is fed via the conduit 29 to an over-flow distributor 30, in which the formic acid is divided into two streams and is partly conducted via the pipe 31 back to the reactor and partly via the pipe 32 to the condensation chamber 33. The purpose of the over-flow distributor is to maintain constant liquid level in the pipe 31 for securing a uniform and constant flow of formic acid to the reactor. The formic acid gathered in the condensation chamber 33 has a content of formic acid of 85–90%. If desired this acid may be tapped into a larger dilution container and therein be diluted with water to regulate the concentration of the formic acid to a constant value of 85%.

The formic acid thus obtained is of very high quality. For example the residue after evaporation amounts to at most 200 mg. per litre and is usually below 30 mg. per litre, while the usual formic acid commercially available has a content of up to 250 mg. per litre. The colour number amounts to at most 30 APHA but is usually near 0. The iron content is also extremely low 0–10 mg. per litre, usually 3–5 mg. per litre, while the commercially available formic acid often contains up to 70–80 mg. iron per litre.

One difficulty in performing this continuous process was that the conventional thin layer evaporators did not function properly. The suspension coming from the reactor is very viscous and has a large content of sodium sulphate. Conventional thin layer evaporators are designed for separating liquids. Therefore they have a very short distance usually about 0.1 mm. between the rotor and the inner wall. According to the present invention this problem has been solved by making this distance much larger approximately 1–5 mm. and by arranging scraper blades on the rotor for scraping off the salt from the inner wall. This is shown in FIGURE 2, where the rotor is indicated by 50 and the inner wall by 51. The distance between the rotor and the inner wall is indicated with the letter *a*. The rotor blades 52 are pivotly suspended in ring 53. Through the action of the centrifugal force they will scrape against the wall. The rotor is normally driven at a speed of e.g., 700–800 r.p.m.

By the present invention many large advantages are obtained compared with the earlier known processes. On account of the fast action of the thin layer evaporator a vacuum plant may be avoided, which substantially simplifies the plant. Thus, besides simpler construction details the condenser may be constructed smaller due to the high temperature of the formic acid and the precipitator for the solids may be eliminated owing to the better separation ability of the thin layer evaporator compared with the distillation bulb. Further the intermediate container being necessary in prior art can be eliminated. The absorption tower also being necessary in connection with a vacuum process to avoid vacuum losses, is of course unnecessary in the process according to the present invention. Finally as mentioned above an unusually good product in almost theoretical amount is obtained.

The equipment is of course not limited to the embodiment shown but can be modified in different ways within the scope of the invention.

I claim:
1. An apparatus for continuously producing formic acid by reaction of sodium formate and sulfuric acid, which comprises a reactor, means for supplying solid and liquid reactants to said reactor, means within said reactor for stirring the reaction mixture, means for cooling the reactor to maintain a predetermined temperature therein, a thin film evaporator connected to said reactor and means to transfer effluent from said reactor to said evaporator at a controlled rate, said evaporator comprising a heat jacketed cylindrical shell and rotary means within said shell for distributing said effluent on the interior walls of said shell, said last mentioned means having a set of fixed blades with a clearance between each fixed blade and said wall of 1–5 mm., and a set of movable blades, each of said movable blades being pivotally mounted intermediate a pair of said fixed blades so that in the extended position it scrapingly engages said wall to remove solids therefrom, means for withdrawing solids continuously from said evaporator, means for removing vapors from said evaporator, means for cooling and condensing said vapors, and means for recycling to said reactor a portion of the condensed vapors.

2. An apparatus for continuously producing formic acid which comprises a reactor provided interiorly with a tubular heat exchanger, means for circulating a cooling fluid through said heat exchanger, thermostatic means for controlling the flow of cooling fluid to maintain a predetermined temperature in said reactor, means for supplying a reaction mixture to said reactor, means including a valved line for withdrawing effluent from the reactor, a rotary stirrer for agitating the reaction mixture, a level regulator for maintaining a constant liquid level in the reactor, said regulator controlling the valve in the effluent conduit from the reactor, a thin film evaporator connected to said line to receive effluent from said reactor, said evaporator comprising a heated cylindrical shell and a rotor mounted concentrically therein for distributing effluent on the interior walls of said shell, said rotor including a plurality of fixed blades having a clearance between each such blade and the wall of said shell from 1–5 mm. and a plurality of movable blades pivotally mounted on said rotor intermediate said fixed blades so that in their extended position said movable blades scrapingly engage said wall to remove solids therefrom, a gas tight cell feeder for removing solids continuously from said evaporator to a storage means, means for removing and condensing formic acid vapors produced in said evaporator, and means for recycling to said reactor a portion of the formic acid condensate.

References Cited
UNITED STATES PATENTS

| | | | |
|---|---|---|---|
| 2,171,809 | 9/1939 | Spence | 23—253 |
| 2,645,661 | 7/1953 | Taylor et al. | 202—175 X |
| 2,875,027 | 2/1959 | Dye | 23—285 |
| 3,199,574 | 8/1965 | Keller | 159—6 |
| 3,199,575 | 8/1965 | Keller | 159—6 |

JAMES H. TAYMAN, JR., *Primary Examiner.*